United States Patent
Larsson et al.

(10) Patent No.: US 10,788,641 B2
(45) Date of Patent: Sep. 29, 2020

(54) CABLE SPOOL AND STORAGE

(71) Applicant: PPC Broadband, Inc., East Syracuse, NY (US)

(72) Inventors: Nicholas B. Larsson, Blomkest, MN (US); George I. Wakileh, Batavia, IL (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 16/077,010

(22) PCT Filed: Feb. 8, 2017

(86) PCT No.: PCT/US2017/016985
§ 371 (c)(1),
(2) Date: Aug. 9, 2018

(87) PCT Pub. No.: WO2017/139359
PCT Pub. Date: Aug. 17, 2017

(65) Prior Publication Data
US 2019/0033547 A1  Jan. 31, 2019

Related U.S. Application Data

(60) Provisional application No. 62/294,716, filed on Feb. 12, 2016.

(51) Int. Cl.
*G02B 6/44* (2006.01)
*B65H 49/36* (2006.01)
(Continued)

(52) U.S. Cl.
CPC .......... *G02B 6/4457* (2013.01); *B65H 49/32* (2013.01); *B65H 49/36* (2013.01); *B65H 59/04* (2013.01);
(Continued)

(58) Field of Classification Search
CPC .................................................... G02B 6/4457
See application file for complete search history.

(56) References Cited

U.S. PATENT DOCUMENTS 5,212,761 A * 5/1993 Petrunia ............... G02B 6/4452
385/135
5,323,479 A    6/1994 Allen
(Continued)

FOREIGN PATENT DOCUMENTS

EP    2811596        12/2014
JP    06183649 A *   7/1994
(Continued)

OTHER PUBLICATIONS

"FutureLink Fiber Terminals & Enclosures—UCS Series," Indoor/Outdoor Solutions for MDU/SFU Deployments, Suttle Solutions Product Specification Sheet 2014 (3 pages).
(Continued)

*Primary Examiner* — Michelle R Connelly
(74) *Attorney, Agent, or Firm* — MH2 Technology Law Group, LLP

(57) ABSTRACT

Systems and methods of dispensing telecommunications cable from a network component are provided. A system includes a housing, an axle, and a spool. The housing defines an interior region and includes a cable storage portion and a mounting surface defining a receptacle. The axle is configured to removably attach to the receptacle. The spool is configured to be disposed on the axle, and has a first flange proximal to the mounting surface and a removable second flange distal to the mounting surface when the spool is disposed on the axle. The spool has a drum portion configured to support a coiled fiber optic cable and dispense the fiber optic cable as the spool rotates on the axle. Undispensed cable can be removed from the spool with the second
(Continued)

flange removed. The cable storage portion of the housing is configured to receive the undispensed coil.

22 Claims, 12 Drawing Sheets

(51) Int. Cl.
  *B65H 75/22* (2006.01)
  *B65H 49/32* (2006.01)
  *B65H 59/04* (2006.01)
  *B65H 75/14* (2006.01)

(52) U.S. Cl.
  CPC .............. *B65H 75/14* (2013.01); *B65H 75/22* (2013.01); *G02B 6/445* (2013.01); *B65H 2701/32* (2013.01); *B65H 2701/34* (2013.01)

(56) References Cited

U.S. PATENT DOCUMENTS

| | | | |
|---|---|---|---|
| 6,363,200 B1 | 3/2002 | Thompson et al. | |
| 6,456,773 B1 | 9/2002 | Keys | |
| 6,483,033 B1* | 11/2002 | Simoes | G02B 6/4457 174/135 |
| 7,083,051 B2* | 8/2006 | Smith | G02B 6/4452 211/26 |
| 7,715,679 B2 | 5/2010 | Kowalczyk et al. | |
| 7,748,660 B2* | 7/2010 | Hendrickson | B65H 49/327 242/406 |
| 7,756,379 B2 | 7/2010 | Kowalczyk et al. | |
| 7,869,682 B2 | 1/2011 | Kowalczyk et al. | |
| 7,894,701 B2 | 2/2011 | Kowalczyk et al. | |
| 8,121,456 B2 | 2/2012 | Gniadek et al. | |
| 8,131,126 B2 | 3/2012 | Kowalczyk et al. | |
| 8,135,256 B2 | 3/2012 | Solheid et al. | |
| 8,189,984 B2 | 5/2012 | Kowalczyk et al. | |
| 8,248,419 B2 | 8/2012 | Iwamoto | |
| 8,254,740 B2 | 8/2012 | Smith et al. | |
| 8,265,447 B2 | 9/2012 | Loeffelholz et al. | |
| 8,374,475 B2 | 2/2013 | Griffioen et al. | |
| 8,380,035 B2 | 2/2013 | Kowalczyk et al. | |
| 8,428,419 B2 | 4/2013 | Leblanc et al. | |
| 8,774,588 B2 | 7/2014 | Kowalczyk et al. | |
| 8,798,429 B2 | 8/2014 | Kowalczyk et al. | |
| 8,805,152 B2 | 8/2014 | Smith et al. | |
| 8,903,215 B2 | 12/2014 | Mathew et al. | |
| 9,036,974 B2 | 5/2015 | Leblanc et al. | |
| 9,042,701 B2 | 5/2015 | Dagley et al. | |
| 9,057,860 B2 | 6/2015 | Kowalczyk et al. | |
| 9,063,316 B2 | 6/2015 | Loeffelholz et al. | |
| 9,097,870 B2 | 8/2015 | Torman et al. | |
| 9,188,760 B2 | 11/2015 | Kowalczyk et al. | |
| 9,261,663 B2 | 2/2016 | Loeffelholz et al. | |
| 9,329,352 B2* | 5/2016 | de los Santos Campos | B65H 75/4471 |
| 2006/0210230 A1 | 9/2006 | Kline et al. | |
| 2008/0315030 A1 | 12/2008 | Hendrickson et al. | |
| 2010/0054680 A1 | 3/2010 | Lochkovic et al. | |
| 2010/0074587 A1 | 3/2010 | Loeffelholz et al. | |
| 2011/0091180 A1 | 4/2011 | Kowalczyk et al. | |
| 2011/0164854 A1 | 7/2011 | Desard et al. | |
| 2011/0293234 A1* | 12/2011 | Srutkowski | G02B 6/445 385/135 |
| 2012/0025005 A1* | 2/2012 | Smith | B65H 75/146 242/603 |
| 2012/0328257 A1 | 12/2012 | Kowalczyk et al. | |
| 2013/0044991 A1 | 2/2013 | Kowalczyk et al. | |
| 2013/0094828 A1 | 4/2013 | Loeffelholz et al. | |
| 2013/0195417 A1 | 8/2013 | Torman et al. | |
| 2013/0209049 A1 | 8/2013 | Kowalczyk et al. | |
| 2014/0010513 A1 | 1/2014 | Kowalczyk et al. | |
| 2014/0105558 A1 | 4/2014 | Kowalczyk et al. | |
| 2014/0161411 A1 | 6/2014 | Slater et al. | |
| 2014/0376871 A1 | 12/2014 | Kowalczyk et al. | |
| 2015/0177442 A1 | 6/2015 | Lin et al. | |
| 2015/0177472 A1 | 6/2015 | Kowalczyk et al. | |
| 2015/0177473 A1 | 6/2015 | Smith et al. | |
| 2015/0309276 A1 | 10/2015 | Collart et al. | |
| 2015/0355428 A1 | 12/2015 | Leeman et al. | |
| 2016/0061354 A1* | 3/2016 | Abby | G02B 6/4457 211/85.5 |
| 2017/0123175 A1* | 5/2017 | Van Baelen | G02B 6/3897 |

FOREIGN PATENT DOCUMENTS

| | | |
|---|---|---|
| WO | 2014072368 | 5/2014 |
| WO | 2014186433 | 11/2014 |
| WO | 2017139395 | 8/2017 |

OTHER PUBLICATIONS

"FutureLink Stackable Fiber Interface Terminal System," Suttle Solutions Product Specification Sheet 2015 (4 pages).
"International Preliminary Report on Patentability," for PCT Application No. PCT/US2017/016985 dated Aug. 23, 2018 (8 pages).
"International Search Report and Written Opinion," for PCT Application No. PCT/US2017/016985 dated Apr. 14, 2017 (13 pages).
"OmniReach FTTX Solutions," MDU Rapid Fiber System Tyco Electronics Product Specification Sheet 2011 (8 pages).

\* cited by examiner

CABLE SPOOL AND STORAGE

PRIORITY

This application is being filed as a PCT International Patent application on Feb. 8, 2017, in the name of Communications Systems, Inc., a U.S. national corporation, applicant for the designation of all countries and Nicholas B. Larsson, a U.S. citizen; and George I Wakileh, a U.S. citizen, inventors for the designation of all countries, and claims priority to U.S. provisional patent application No. 62/294,716, filed Feb. 12, 2016, the content of which is incorporated by reference herein in its entirety.

FIELD

This disclosure relates to terminals for wired communications networks. This disclosure more particularly relates to communications network terminals with the facility to dispense communications cables.

BACKGROUND

Telecommunications networks generally include several components that enable the sophisticated transmission and distribution of communications signals between locations connected to a particular network. The structural components of a wireline communications network include, among other things, terminals at various locations in the network, communications cables, and connectivity components that operatively join the various cables together.

As a basic example, a communications network may include a central office building operated by a communications service provider, as well as several customer premises. One or more communications cables (or possibly an interconnected network of several cables) connect each of the customer premises to the central office building. In the case of a single customer premise, a communications cable from the central office is connected to a terminal located at the customer premise. The terminal provides a housing or enclosure in which the communications cable is connected to a variety of electrical and/or optical transmission components, such as signal conditioners, filters, amplifiers, splitters, and/or other components. Additional communications cables coupled to the same components can then carry the communications signals to various locations within the customer premises. Accordingly, one or more cable connecting assemblies may be used to operatively couple communications cables from the central office with one or more cables and/or components within the terminal.

The physical distances between network components within a particular premise are variable and specific to the premise. The cables used to couple network components are therefore required to be routed through varying distances. In some installations, a communication cable is routed between two components of a network, cut to the desired length, and then connectors are added to the cut ends so that they can couple to the network components. If the communication cable is an optical fiber cable, adding connectors to a cable, or connectorizing, is often a time-consuming task that requires a highly skilled technician. For this reason, some cables are provided from the manufacturer with connectors already present, or with the ends pre-cut and configured to easily accept connectors. Such factory-terminated cables come in set lengths from the manufacturer. In some installations, a factory-terminated cable can be chosen that is at least long enough to couple the subject components. If factory-terminated cables are used, there is typically an amount of excess cable length that must be managed. Many network components include enclosures with the facility to store excess cable slack so that factory-terminated cables can be used.

During cable dispensing, also referred to herein as payout, cable is pulled from a spool and routed through a desired pathway. As those skilled in the art will appreciate, a cable can be pulled or pushed through a route, using, for example, mandrel pulling or air blowing. For the purposes of this application, the process of moving a cable through a route to a destination will be referred to as "pulling" because the cable is pulled with respect to a cable dispensing mechanism during payout. Generally removing cable from the cable dispensing mechanism is referred to as "dispensing."

In order to facilitate the routing of cables from one network component to the next, some network components have been created that incorporate a cable dispensing mechanism. On some such components, a communication cable can be unwound from a spool as its end is brought to a destination component. After the desired length has been unwound from the spool, the slack can either remain on the spool or be removed and disposed on a cable slack storage device of the component.

SUMMARY

The teachings herein are directed to, among other things, communications network components including, but not limited to, terminals, enclosures, housings, termination systems, telecommunications cable dispensing systems, and methods related to dispensing communications cables.

According to one aspect, a method of dispensing optical fiber from an enclosure is provided. The method includes removably mounting an axle to a mounting surface of an enclosure. The method further includes disposing a spool on the axle. A fiber optic cable is coiled around a drum portion of the spool. The fiber optic cable is retained on the drum portion of the spool by a first flange that is proximal to the mounting surface, and a removable second flange that is distal to the mounting surface. The method includes removably securing the spool on the axle. The method further includes dispensing a desired length of the fiber optic cable from the spool. A slack coil, which includes a length of fiber optic cable remaining on the spool, is left on the spool. The method also includes removing the second flange from the spool. The method further includes removing the slack coil from the spool without unwrapping the slack coil and storing the slack coil within a first interior region of the enclosure. The method also includes removing the spool from the axle and removing the axle from the mounting surface of the interior region of the enclosure.

In one implementation, the mounting surface of the enclosure is a second interior region of the enclosure. In some cases, removably mounting the axle includes rotating the axle relative to an axle-coupling structure to engage a locking structure, and in other cases it includes engaging threads on the axle with threads on an axle-coupling structure. In some implementations, removably securing the spool on the axle includes removably mounting a retention device to an end of the axle distal to the mounting surface. In some implementations, removing the slack coil from the spool includes radially inwardly collapsing the drum portion of the spool. In some implementations, removing the slack coil from the spool includes translating the slack coil outwardly from the mounting surface. In some implementations, storing the slack coil within the interior region of the enclosure comprises holding the slack coil with radially symmetrically arranged storage clips. In some cases of such implementations, the storage clips form a radius that is not less than one tenth and not more than ten times the radius of the drum portion of the spool.

According to another aspect, an optical fiber termination system is provided. The system includes a housing defining an interior region. The housing includes a cable storage portion and a mounting surface defining a receptacle. The system also includes an axle configured to removably attach to the receptacle. A spool is configured to be disposed on the axle. The spool has a first flange proximal to the mounting surface when the spool is disposed on the axle. The spool also has a removable second flange distal to the mounting surface when the spool is disposed on the axle. The spool has a drum portion coupled between the first flange and the second flange. The drum portion is configured to support a coiled fiber optic cable and dispense the fiber optic cable as the spool rotates on the axle. The second flange is removable from the drum portion. Undispensed cable can be removed from the spool with the second flange removed. The cable storage portion of the housing is configured to receive the undispensed coil.

In some implementations, the cable storage portion includes clips arranged in radial symmetry. In some implementations, the axle is configured to removably attach to the receptacle without the use of a tool. In some implementations, the system includes a retention device configured to removably retain the spool on the axle. In some systems including a retention device, the retention device is configured to adjustably apply drag to the spool. In some systems including a retention device, the retention device is configured to removably attach to the axle without the use of a tool. In some cases, the axle is configured to couple to the receptacle by engaging a locking structure, and in other cases the axle is configured to couple to the axle-coupling structure by engaging threads.

In some implementations, removing the undispensed coil of the fiber optic cable from the spool is performed without unwrapping the coil from the drum portion of the spool. In some implementations, the drum portion of the spool includes a hub and an outer cable-mounting surface. The hub includes an inner axle-mounting portion that provides a bearing surface for the axle. In some implementations, the cable storage portion of the housing is in the interior region of the housing. In some implementations, the mounting surface of the housing is in the interior region of the housing.

According to yet another aspect, a telecommunications cable dispensing system is provided. The system includes an axle configured to be removably mounted to a mounting surface of a terminal. The axle has a proximal end configured for receipt by the mounting surface. The axle also has a distal end distal from the mounting surface in a mounted configuration. The system includes a cable spool configured to be removably disposed on the axle in the mounted configuration. The cable spool has a first flange proximal to the mounting surface in the mounted configuration. The spool also has a drum portion coupled to the first flange. The spool also has a second flange removably coupled to the drum portion opposite the first flange. A provided retention device is configured to removably retain the cable spool on the axle. The cable spool is configured to dispense a fiber optic cable as the spool rotates on the axle. An undispensed coil of the fiber optic cable can be removed from the spool in the removably mounted configuration without unwrapping the coil.

These and various other features and advantages will be apparent from a reading of the following detailed description.

BRIEF DESCRIPTION OF THE DRAWINGS

The following drawings illustrate some particular embodiments of the present invention and therefore do not limit the scope of the invention. The drawings are not to scale (unless so stated) and are intended for use in conjunction with the explanations in the following detailed description. Some embodiments will hereinafter be described in conjunction with the appended drawings, wherein like numerals denote like elements.

DETAILED DESCRIPTION

Figure 1:
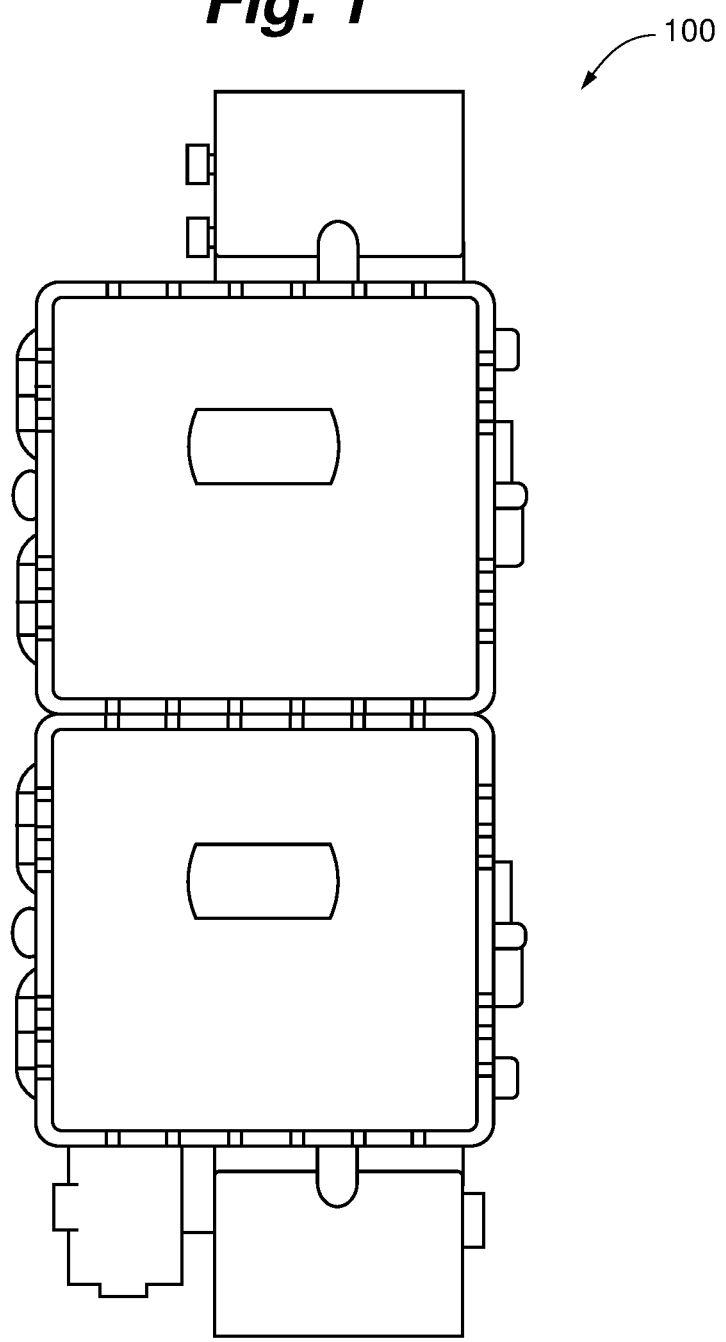
FIG. 1 is a front view of a terminal enclosure.

The following detailed description is exemplary in nature and is not intended to limit the scope, applicability, or configuration of the invention in any way. Rather, the following description provides some practical illustrations for implementing some embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Communications network components, systems, and methods are described herein that can be used to, among other things, terminate one or more communications cables, transition between communications cables, serve as network distribution points, and dispense communications cables. Among several possibilities, examples of network terminals, communications cable dispensers, and methods of dispensing communications cables are described. Those skilled in the art will appreciate from this disclosure that the examples described herein are just some of the possible ways to implement the present invention and that other implementations can also be practiced based on the teachings herein.

In one example, a terminal enclosure is provided a cable dispensing mechanism. The terminal enclosure can be preconfigured during manufacture to include one or more communications components such as, e.g., hardware components, which may be suited for different types of network signal conductors, such as copper wire(s) and optical fibers, carried within communications cables. One example of a potential network hardware component for a copper cable is a signal filter. One example of a potential network hardware component for an optical fiber is a slack storage compartment. Of course many other types of network components, both active and passive, are known in the art and could be located within a sealed terminal enclosure or other enclosure according to the teachings herein. Implementation of a sealed terminal can involve a terminal with at least one port on each side of the terminal. A cable adapter can be mounted to each port in order to terminate a circuit, optical device, or other network component located within the terminal. The ports can be configured for single or multi-fiber connections. The terminal can optionally have integrated internal and/or external cable management. In some cases a terminal can be installed in one or more locations, including, for example, on a wall, on a pole, in a pedestal or below grade.

As used herein, "housing" and "enclosure" are used interchangeably to refer to a housing for network components. A "terminal" is used to refer to a network hardware component that receives one or more communications cables. A terminal may include a housing or enclosure, or may be an exposed rack or panel. The term "terminal enclosure" is used herein to generally refer to an enclosure that houses a terminal, with or without the terminal itself. It will be appreciated by those skilled in the art that references to communications cables are generic references to all kinds of elongated, continuous signal transmission media, including, for example, optical fibers and metal wires, that are configured to carry signals conveying information, including communications information and other data, in analog or digital formats. Communication cables with optical fibers may have one or more fibers, while communication cables with metal wires may be formed from copper and/or have a single wire, twisted pair, coaxial, or other configuration. In addition, the term "communications cable connecting assembly" is used herein to refer to the usual coupling mechanism for a communications cable that includes at least one element affixed to the end of a cable and a second element either affixed to the end of another cable or mounted to a wall of an enclosure.

In one example, a communications cable termination system is provided. The system can be used to terminate optical fiber cables, copper wire cables, and other communications cables. The system includes a housing which may be a communications cable terminal network component as described herein. The housing includes a cable storage portion, also called a slack storage or slack management system, and a mounting surface. The mounting surface defines a receptacle that is configured to receive an axle in a removably attachable manner. The termination system includes a spool that is disposed on the axle. The spool includes two flanges, at least one of which is removable. A drum portion of the spool carries a communications cable. The system is configured dispense a desired length of the communications cable from the spool and leave an amount of undispensed slack cable on the spool. The system is configured to allow the slack cable to be removed from the spool and disposed on the cable storage portion of the system. One of the spool flanges can be removed and the spool drum can be collapsed to facilitate slack removal.

In another example, a telecommunications cable dispensing system is provided. The dispensing system includes an axle, a spool, and a retention device. The axle is configured to attach to a portion of a network hardware component. The network hardware component may be a terminal or enclosure that is designed to accept the axle, or it may be a component that is preexisting and the dispensing system is retrofitted thereto. The spool, which carries communications cable, is configured to be mounted on the axle. The spool can be retained on the axle by using a retaining device to hold it thereon. An amount of communications cable can be paid out from the spool, thereby leaving an undispensed amount of cable slack on the spool. The undispensed slack can be removed from the spool by removing a removable flange from the spool, collapsing a drum portion of the spool, and sliding the slack off of the spool. The cable dispensing system can then be removed from the network hardware component.

Also disclosed is an example method of dispensing optical fiber from a network hardware component. In this example, an axle is removably mounted to a portion of an enclosure. A spool is provided with an amount of communications cable coiled around a drum portion of the spool. Two flanges prevent the cable from sliding off of the drum. The spool is then disposed on in a manner that allows it to rotate about the axle. An amount of cable is dispensed from the spool by pulling on a first end of the cable, thereby rotating the spool and unwrapping cable therefrom. After a desired amount of cable has been dispensed from the spool, one of the spool flanges is removed. This allows an undispensed and unwrapped amount of cable that remains on the drum of the spool to be removed as a slack coil. To facilitate slack removal, the drum portion of the spool may be collapsed to reduce tension on the coil. After the slack is removed, the spool and axle are removed from the enclosure.

Turning now to the drawings, FIG. 1 shows a wired communication cable terminal 100. In this example, the terminal 100 is an enclosure in a closed configuration. Such a terminal may be used in a network at various locations on a premise. In some examples, the terminal 100 may be configured as a main point of entry to a premise. In such a network hub configuration, the terminal 100 receives a feeder line from a central network and splits it into drop lines that are routed elsewhere on the premise. In other examples, the terminal 100 may be configured as a secondary distribution enclosure. In such a configuration, the terminal 100 receives a drop cable from a main point of entry network hub and further splits it into one or more lines that are routed elsewhere on the premise. There are many other possible configurations of the terminal 100, so the terminal 100 can be classified generally as a network component.

A terminal such as the terminal 100 typically has an input and an output. The enclosure of a terminal 100 contains the facility to manipulate the input in a manner to provide the output. In some examples, the enclosure may contain splicing hardware that splices a wired input signal carrier into multiple output signal carriers. In other examples, the enclosure may contain signal processing or filtering hardware that affects the signals carried by the input and output hardware. The input and output may be communication cables, such as optical fiber cables and copper cables, or other telecommunication signal transmitting hardware. In some examples, the function of the box may be to simply couple two or more cables, and the input and output are substantially the same. Many wired network components are known in the art that could be embodied by terminal 100.

In the example illustrated by FIG. 1, the terminal 100 is a wall-mounted unit. Other like terminals may be post-mounted, floor mounted, cabinet mounted, installed below grade, and the like. The terminal may be configured to interface with microducts, moldings, raceways, conduits, or hardware used to sheathe and protect communications cables.

Figure 2:
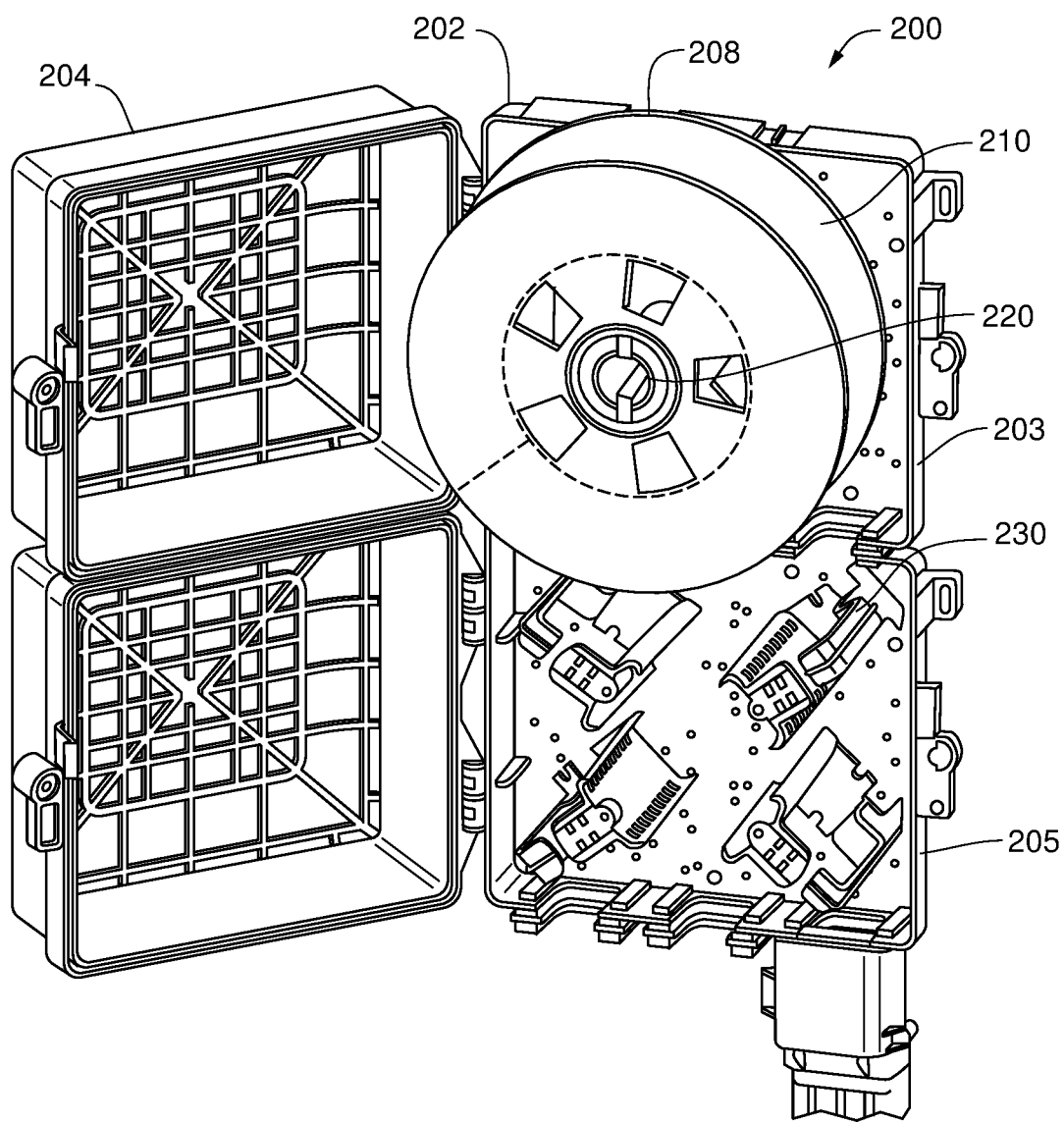
FIG. 2 is a perspective view of a terminal enclosure with a communications cable dispensing mechanism attached thereto.
Figure 3:
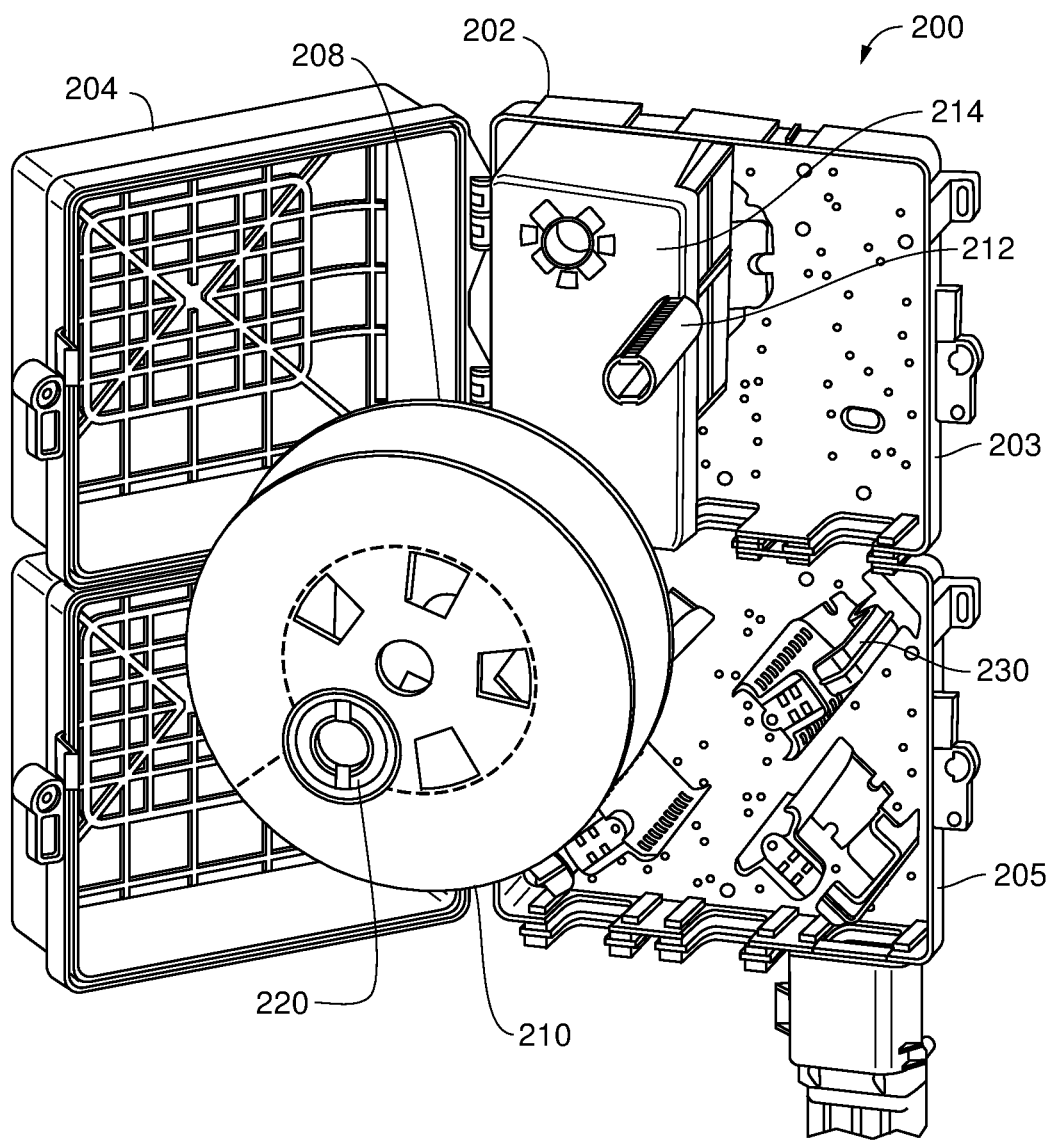
FIG. 3 is an exploded perspective view of the cable dispensing mechanism of FIG. 2.
Figure 4:
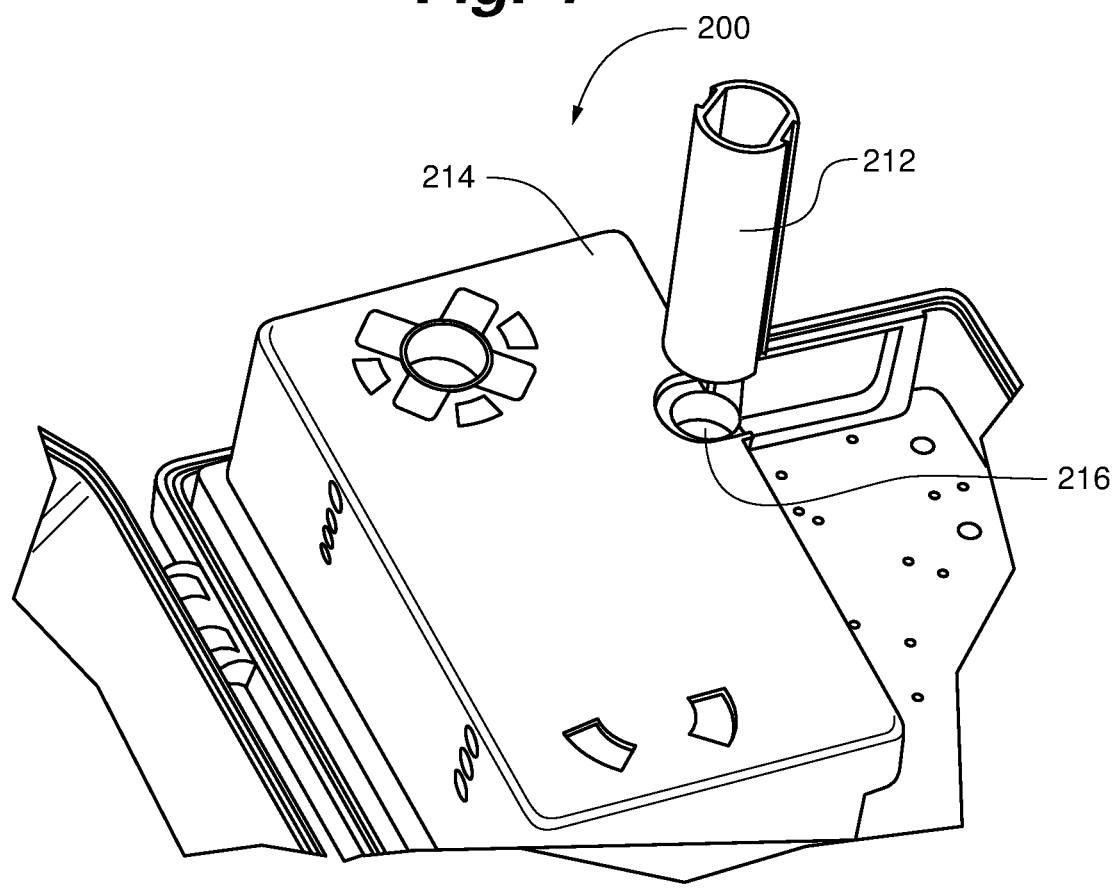
FIG. 4 is a perspective view of an axle and an interior region of the terminal enclosure of FIG. 2.

Referring now to FIGS. 2-4, an enclosure 200 is provided with the facility to dispense communications cable. In some examples, the facility to dispense communications cable includes removable hardware that is attached to the enclosure during cable payout. In the example illustrated by FIGS. 2-4, a cable dispensing assembly 208 provides the facility to dispense cable. The dispensing assembly 208 includes a cable spool 210, an axle 212 used to support the spool 210, and a spool retainer 220 is used to retain the spool 210 on the axle 212. In this particular example, the dispensing assembly 208 is removable from the enclosure.

FIG. 2 illustrates the enclosure 200 in a cable dispensing configuration. The enclosure 200 contains a base portion 202 and a door portion 204. In this example, the door portion 204 is hingedly attached to the base portion 202. In this example, the enclosure 200 has a modular design that includes a terminal module 203 removably connected with a cable storage module 205. It should be understood that this is just one of many possible configurations for the enclosure 200. As another possibility, cable dispensing and/or cable storage could be provided by a single module.

In this example, the door portion 204 is not able to shut when the dispensing assembly 208 is attached to the interior of enclosure 200. In such examples, cable dispensing is performed with the enclosure 200 in an open configuration. Removing the dispensing assembly 208 from the enclosure 200 allows the door portion 204 to be closed. The use of a removable dispensing assembly allows an enclosure to remain compact without sacrificing cable dispensing functionality. For example, in some cases the removable nature of the cable dispensing assembly 208 allows for a large spool, with e.g., a larger cable capacity, to be used without requiring that the entire enclosure be sized to house the spool. Therefore some implementations may facilitate dispensing a greater amount of cable than would be possible with a spool sized to stay within a small, compact enclosure.

The spool 210 contains undispensed communication cable. Typically, a spool such as 210 will be brought to the location of the enclosure installation with a full length of cable. In some examples, the spool is provided from a cable manufacturer with a known length of cable disposed thereon. In other examples, the installer coils a cable on the spool before bringing it to the location of the enclosure. The spool 210 may contain one or more discrete cable lengths and may also contain different varieties of cable. The cable can be an optical fiber cable, metal wire cable, or any other type of wired communications cable.

The spool is attached to the enclosure 200 by disposing it on the axle 212, as illustrated by FIG. 3. The axle 212 protrudes from a mounting surface of the enclosure 200 and is configured to accept the spool. The spool retainer 220 is inserted on the axle, thereby sandwiching the spool 210 between the retainer 220 and the mounting surface 214. In many examples, the position of the retainer 218 is axially adjustable on the axle. This enables the axle to accept spools of differing widths without excessive axial play. It also allows the retainer 218 to snug up with the spool 210 to a desired amount. A user may use the retainer 218 to adjustably apply drag to a spool 210 to conform to their installation preferences. An amount of drag applied to the spool 210 prevents it from freewheeling when rotation is undesirable.

As a cable is pulled from the spool 210, the tension on the cable must be sufficient to overcome static friction acting on the spool 210. Once the static friction is overcome, the spool 210 rotates about the axle 212, which is fixed to the enclosure 200 in this example. FIG. 4 illustrates one example of a removable mounting configuration by which the axle 212 can be mounted to the enclosure 200. In this example, the enclosure has a mounting surface 214 on an interior region of the enclosure 200. As shown in FIG. 4, the mounting surface 214 defines an axle receptacle 216. The axle receptacle 216 is a portion of the mounting surface 214 that is configured to receive the axle 212 and attach thereto. In this example, the axle 212 attaches to the receptacle 216 in a removable manner. In some cases the axle 212 can be attached by hand without using tools. Although not shown in FIG. 4, in some cases a rotational bearing can let an axle rotate with respect to the enclosure. In the implementation shown in FIG. 4, the axle 212 is fixed with respect to the mounting surface 214 and the spool 210 is configured to rotate with respect to the axle 212.

As the spool 210 rotates about the axle 212, dynamic friction between the spool 210 and both the retainer 220 and the mounting surface 214 applies a drag to the spool 210. In some examples, a flanged axle is used, so that friction is applied to the spool 210 by the axle 212 and the retainer 220. In some cases such drag can reduce or prevent freewheeling of the spool 210 if cable pulling ceases rapidly. Allowing the spool 210 to undergo substantial inertial freewheeling can in some cases cause cable to be rapidly unwound from the spool 210 without a proper place to be routed. This kind of rapid, uncontrolled unwinding of cable can in some cases damage metal wiring or brittle optical fibers inside the cable.

The mounting surface need not be such a large, planar surface as depicted by the mounting surface 214 of FIG. 4. For example, a mounting surface can be any surface of an enclosure that provides sufficient room to mount an axle and a spool disposed thereon. The location of the mounting surface allows a clear path for cable to be paid out through one of the enclosure's cable exits. In some cases a mounting surface can provide a bearing surface that limits the axial travel allowed by a spool in a direction toward the surface.

Figure 5:
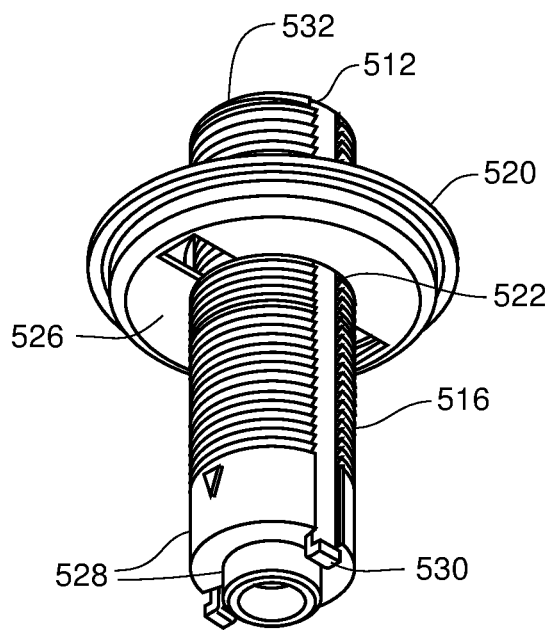
FIG. 5 is a perspective view of one example of a spool axle.
Figure 6:
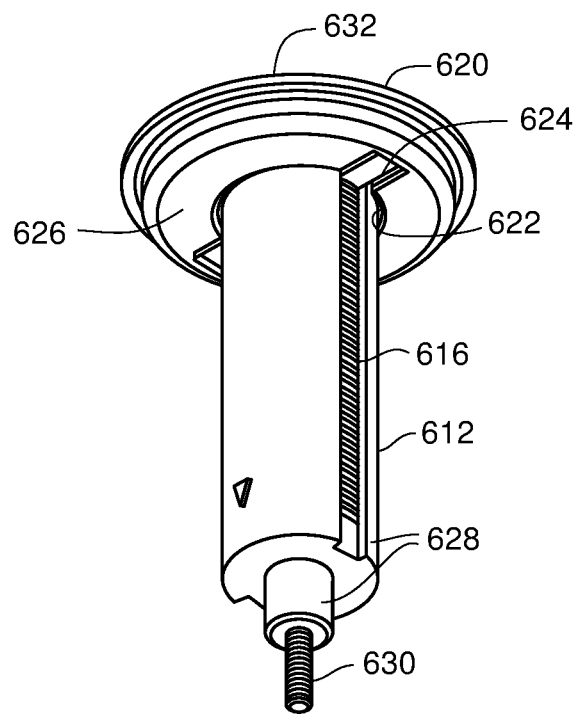
FIG. 6 is a perspective view of another example of a spool axle.
Figure 7:
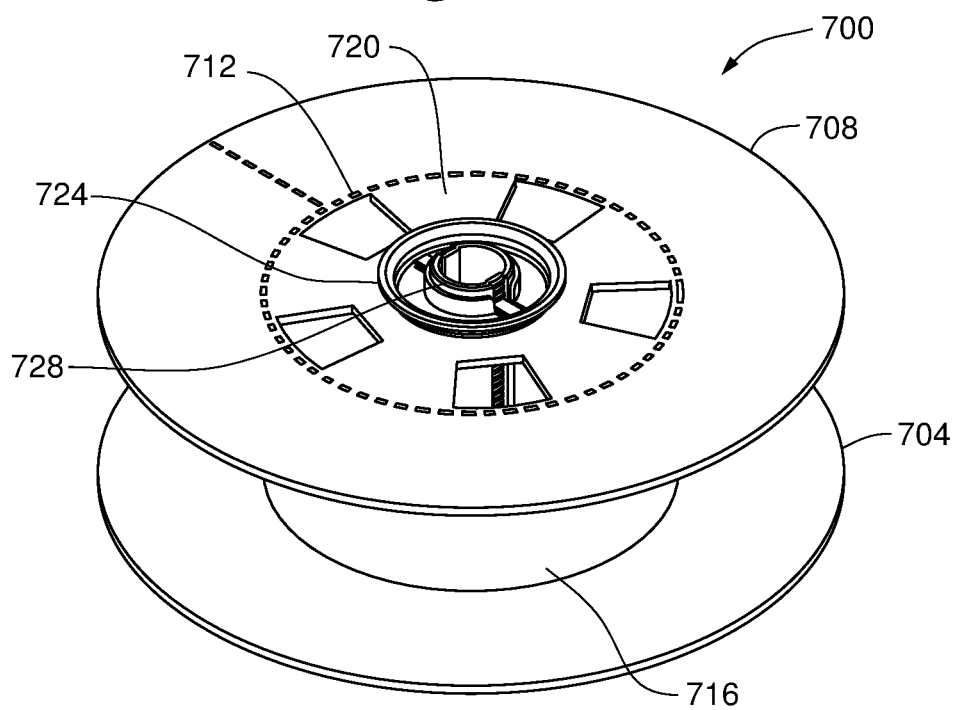
FIG. 7 is a perspective view of a cable spool.

Turning to FIGS. 5-7, example axle and spool retainer pairs are shown in FIGS. 5 and 6, and an example spool is shown in FIG. 7. Each axle provides a bearing surface for a cable spool, and is diametrically sized to function with a compatible spool. Each axle is configured to securely attach to a network component, such as the enclosures illustrated by FIGS. 1-4. In some examples, the axles are configured to attach to an enclosure without the use of tools. Each axle is configured to receive a spool retainer and in some cases to adjustably position it on the axle. FIG. 7 illustrates an example of a spool that can be used in a cable dispensing assembly of a network component or enclosure. Spool 700 includes a first flange 704, a second flange 708, a weakened interface 712, a drum 716, and a hub 720. The hub is configured to interface with an axle 728 and a spool retainer 724.

Returning to FIG. 5, an axle 512 having rigid mating surfaces 528 is illustrated. The mating surfaces 528 are provided for insertion into a receptacle of an enclosure. The mating surfaces 528 are designed to provide structural support to the axle 512 by carrying the bending and bearing stresses when attached to an enclosure. The axle 512 also includes feet 530. The feet 530 are configured to interlock with a corresponding locking structure of an enclosure.

Examples of axles such as the axle 512 are configured to be inserted into an enclosure receptacle and rotated to engage interlocking feet. The feet 530 are designed to bear axial loads imposed on the axle 512, and retain the axle 512 in a receptacle.

The axle 512 is characterized by exterior threads 516 configured to engage with a correspondingly threaded retainer 520. In this example, the retainer 520 is an annular shaft collar with a threaded central hole 522. The hole 522 has the same thread pattern as the exterior axle threads 516. The retainer 520 is received by the axle 512 by rotating it to engage the threads on a distal end of the axle 512. The distal end 532 is the end of the axle 512 that is distal from the mating surfaces 528. In an assembled state, the distal end 532 is distal from a mounting surface on an enclosure to which the axle is attached. The axle 512 is depicted without a spool so that the threads 516 can be seen more clearly, but in many examples a spool, such as spool 700, is disposed on the axle 512 before the retainer 520 is attached. The retainer 520 can be moved axially toward and away from the distal end 532 by rotating it with respect to the axle 512. The retainer 520 follows the threads up or down. This adjustability enables the axle-retainer pair to accommodate spools of differing widths. It also enables a user to adjust the amount of resistance a spool has to rotation. A bearing surface of the retainer 526 is configured to interface with the hub of a spool and apply compression when the retainer 520 is at an axial position on the axle 512 that causes the bearing surface 526 to contact the spool hub. This resistance can be adjusted by moving the retainer toward or away from a spool to increase or decrease a clamping force on the spool hub exerted by the bearing surface of the retainer 526 and a second bearing surface, such as an enclosure mounting surface.

In some cases, axle-retainer pairs using a threaded interface include a thread locking mechanism to prevent unintentional rotation of the retainer. If the retainer is tightened against a spool to cause drag, the spool will apply torque to the retainer during spool rotation. This torque will act in a direction to either loosen or tighten the retainer, depending on the direction of spool rotation. An adequate thread locking mechanism can prevent the retainer from rotating as a result of torque applied by the spool, thereby maintaining a constant amount of drag. Other mechanisms for preventing the rotation of the retainer with respect to the axle can also be used. Examples include, but are not limited to, deformable annuli such as can be found on locknuts, jam nuts, thread locking fluid, pins, keys, and the like. In many examples, the thread locking mechanism is selectively engageable by a user so as to allow desired rotation and prevent undesired rotation.

FIG. 6 illustrates another example of an axle-retainer pair. An axle 612 is coupled to a retainer 620 and together they function similarly to the axle and retainer of FIG. 5. The axle 612 includes mating surfaces 628 that are designed to bear the bending and bearing stresses when the axle 612 is attached to an enclosure. The axle 612 also includes a threaded stud 630 used to secure the axle 612 to a mounting receptacle of an enclosure or other network component. The threads of stud 630 engage with like threads in a mounting receptacle, and bear at least axial loads.

The axle 612 is characterized by exterior racks of teeth 616. The teeth 616 are configured to engage with the retainer 620. Specifically, the retainer 620 is disposed on the axle 612 by inserting the axle 612 through a central hole of the retainer 620, and resilient fingers 624 interfere with the teeth. Each resilient finger 624 corresponds with a rack of teeth 616 on the axle 612. In this particular example, the axle 612 has two racks of teeth 616 and the retainer 620 has two resilient fingers 624. In other examples, the number of racks of teeth and corresponding resilient fingers may be more or less than two. The resilient fingers 624 are radially inwardly oriented and protrude from the inner hole 622 to the extent that they engage the recessed racks of teeth 616 on the axle 612. The teeth 616 of the axle 612 and fingers 624 of the retainer 620 act as a ratchet mechanism that allows the retainer 620 to move in a single axial direction away from a distal end of the axle 612 and toward a mounting surface. The distal end 632 is the end of the axle 612 that is distal from the mating surface 628 and the threads of stud 630. An operator can dispose the retainer 620 on the distal end on the axle 612 and move the retainer 620 toward a hub of a spool. A bearing surface of the retainer 626 is configured to interface with the hub of a spool and apply compression when the retainer 620 is at an axial position on the axle 612 that causes the bearing surface 626 to contact the spool hub. Compression applied to the spool hub by the retainer 620 effectively clamps the spool between the bearing surface 626 and a mounting surface of an enclosure, thereby causing resistance to rotation, or drag. A user can apply a desired drag to the spool by positioning the retainer 620 at a desired axial position. The axle teeth 616 can be numerous enough such that there is minimal ratchet backlash, thereby providing adequate resolution in selecting an amount of drag to apply.

Retainer removal can be effected by manually deflecting the fingers 624 to the extent that they do not interfere with the axle teeth 616 to disengage the ratchet mechanism. The retainer can then be freely axially translated toward the distal end of the axle 612 and fully removed. In some examples, a user can remove a retainer simply by pulling it off from an axle with enough force to overpower the ratchet mechanism. In other examples, the ratchet mechanism is not able to be disabled or overcome, and retainer removal can only be effected by first removing the axle from its mounting receptacle and translating the retainer off of the axle in the direction allowed by the ratchet. In some examples, such as the example illustrated by FIG. 6, the retainer can be removed without using tools.

Various structures may be used to attach an axle to an enclosure or other network component. By way of example, bayonet connectors, snap fits, press fits, and the like can be used. The portion of an axle-coupling receptacle that is configured to provide a secure attaching structure can be referred to generally as a locking structure. By way of example, a locking structure may include bayonet slots, locking pins, barbs, resilient fingers, and the like. Attaching structures that require the use of tools may be used in some examples. The attaching structure must secure the axle to a corresponding network component with sufficient integrity to allow a spool to be mounted and manipulated thereon. In some examples, a spool axle is permanently attached to a network component. The axle may be an integral feature molded to a part. Alternatively, a permanent axle may be adhered or welded to a part of a network component.

The interface between an axle and a retainer can be any that enables the retainer to removably attach to the axle and be axially adjusted. Examples other than the threaded and ratchet interfaces illustrated by FIGS. 5 and 6 can be used. Such interface mechanisms may include clamps, locking rack and pinion mechanisms, friction ratchets, and the like. In some examples, a retainer is integral to an axle, and spool insertion and removal is performed while the axle is detached from an axle-coupling receptacle. Any retainer, collar, or other means of retaining a spool on an axle can be referred to generally as a retention device.

The axles used are generally polymeric, but other materials such as metals and woods can be used. The material of an axle should be selected that interfaces well with the material of a spool. Axles are generally reusable and should be made of a durable and wear-resistant material. As an example, if a cardboard spool is used, an axle may be a molded plastic part that receives minimal wear when interfaced with the relatively soft cardboard. In many examples, the material of the axle will be dissimilar from the material of a spool so that friction, wear, and noise are minimized. In many examples, the axle is composed of plastic. A retainer may comprise a polymeric, metallic, wooden, or other material. In many examples, the retainer is composed of plastic.

The spool of FIG. 7 will now be discussed in more detail. The spool hub 720 is a central portion of the spool 700 that interfaces with an axle 728. The axle 728 is consistent with the examples discussed above in the descriptions of FIGS. 5 and 6. The spool 700 is disposed on the axle 728 by inserting the axle 728 through a central hole in the hub 720. A spool retainer 724 is disposed on the axle 728. The retainer 724 is consistent with the examples discussed above in the descriptions of FIGS. 5 and 6. The retainer 724 interfaces with the spool hub 720 and may apply a drag to the spool.

The spool 700 is configured to carry an amount of communication cable (not shown in FIG. 7). The communication cable can be a wired telecommunication signal transmission carrying medium such as a copper cable or optical fiber cable. Many cables, such as optical fiber cables, are characterized by a minimum bend radius. If any portion of the cable is bent to a radius smaller than its minimum bend radius, then damage may occur to the contained fibers or wires. The drum portion 716 of the spool 700 includes a cylindrical surface with a radius that is at least as large as the minimum bend radius of a cable disposed thereon. In some example spools, the drum portion is collapsible. A collapsible drum can facilitate the removal of an unused slack portion of a cable as the cable may be wrapped tightly there around. In various examples, the drum is made of a cardboard material, which may be crushable or collapsible. Other possible materials for the drum include a plastic material, a fiberboard material, and/or other materials. Drums that are made of substantially rigid materials, such as plastic or fiberboard, may include a weakened portion to render the drum collapsible. For example, a weakened portion of the drum can be created by partially cutting through a part of the drum. Drums made out of cardboard material or other less rigid materials may also optionally include a weakened portion.

The spool 700 includes flanges that retain the cable on the drum 716. A proximal flange 704 is the flange of the spool that is positioned proximal to a mounting surface when installed on an enclosure or other network component. A distal flange 708 is the flange of the spool that is positioned distal from said mounting surface. The flanges 704 and 708 can be made of a polymeric material, a wooden material, a wood-fiber material, a metal, and the like. In some examples, the flanges are made of a corrugated plastic material. In other examples, the flanges are made of a corrugated fiber or cardboard material. The flanges of a spool are rigid enough to retain a cable on a spool or spool drum. The distal flange 708 is removable from the rest of the spool 700. The distal flange 708 is removed so that an unused portion of cable, or slack, can be removed from the drum 716 without unwinding it. A weakened interface 712 facilitates the removal of the distal flange 708. The weakened interface 712 may include a plurality of perforations that allow the distal flange 708 to be torn away from the hub 720. In other examples, the weakened interface 712 may be characterized as having a thinner wall than the rest of the flange 708. Any means of providing a weakened interface that enables the distal flange 708 to be removed from the hub can be used. The weakened interface 712 has the integrity to retain the cable on the spool 700 during payout, but is weak enough that the distal flange 708 can be removed without damaging other parts of the spool 700.

Figure 8:
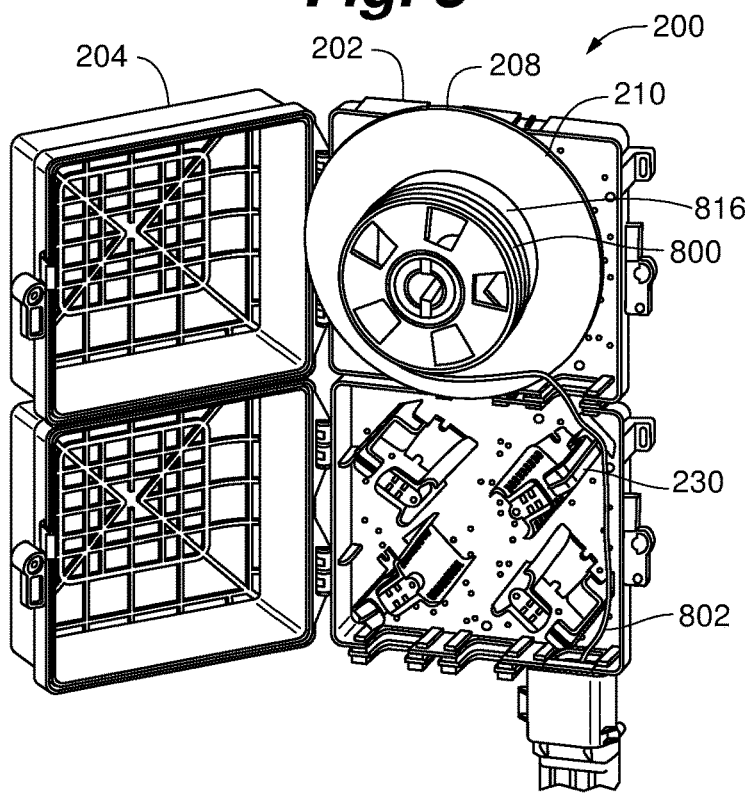
FIG. 8 is a perspective view of a terminal enclosure with a cable slack coil disposed on a spool.
Figure 9:
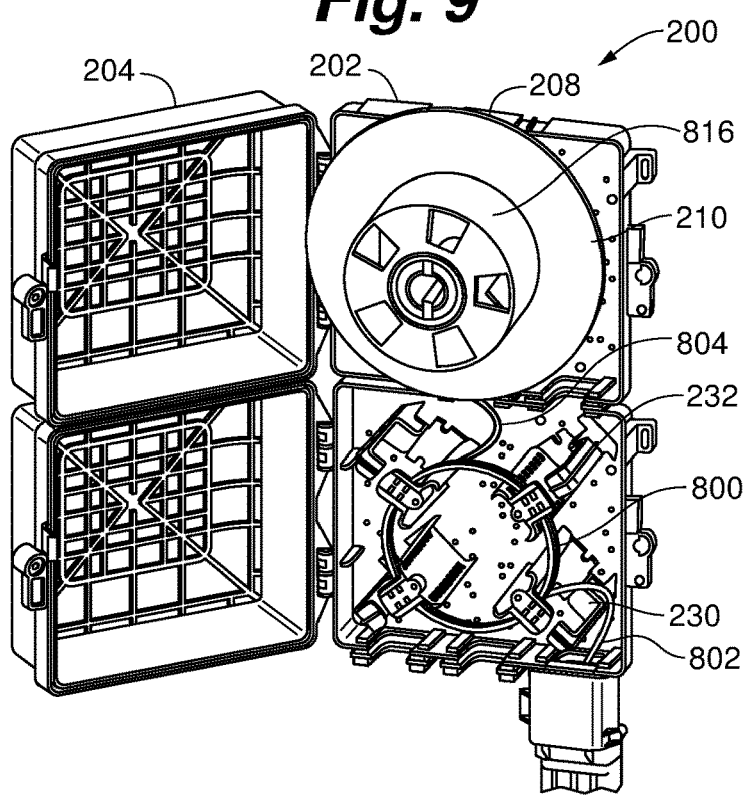
FIG. 9 is a perspective view of the enclosure of FIG. 8 with cable slack disposed on a slack storage system.

An enclosure coupled to a spool consistent with the examples described herein is illustrated in FIGS. 8 and 9. The utility of a spool with a removable flange is demonstrated by these figures, which show the removal of cable slack from a spool.

FIG. 8 shows the enclosure 200 of FIGS. 2-4 coupled to the cable dispensing assembly 208 as it appears after cable dispensing has occurred. The enclosure 200, which includes the base portion 202 and the door portion 204, is shown in an open configuration. A desired length of fiber 802 is dispensed from the spool 210, through the interior of the enclosure 200, and out through the enclosure 200 to a desired premise location. A cable slack portion 800 remains on the drum of the spool 210. The slack 800 is an undispensed and coiled or wound portion of cable. After cable payout, the cable dispensing assembly 208 can be removed from the enclosure 200 so that the enclosure 200 can be closed. A removable distal flange (not shown) is removed from the spool 210 so the slack 800 can be translationally removed from the spool 210. The slack may be tightly wound on the spool 210, and in some examples it is necessary to collapse a drum portion of the spool 816 radially inwardly to free the slack 800 for removal. In such examples requiring drum collapsing, the drum portion of the spool 816 may include a weakened portion to facilitate drum collapsing. One example of a possible configuration of a weakened portion is the weakened interface 712 shown on the spool 700 in FIG. 7. Returning to FIG. 8, the slack 800 can be removed by translating it outwardly away from the spool 210 and enclosure 200.

FIG. 9 shows the enclosure of FIG. 8 with the slack 800 removed from the spool 210. The slack 800 is disposed on a slack storage portion 230 of the enclosure 200. In some cases, once the slack 800 is removed from the spool 210 and the spool 210 removed from the enclosure 200, another end 804 of the cable is connected to a terminal bulkhead mounted within the enclosure. In FIGS. 8 and 9, the bulkhead is located behind the spool 210, and thus out of sight in these particular views. The end 804 of the cable can be seen extending away from the slack coil 800, and further extending through an opening in a wall and then behind the spool 210. Of course the other end 804 of the cable can be routed to and terminated at any desirable location, within or without the enclosure 200. In some cases the end 804 of the cable may be connected to the terminal after removing the slack 800 from the spool, but before disposing the slack 800 on the slack storage portion. In some cases, the slack may be first disposed on the slack storage portion 230, after which the end 804 of the cable is connected to the terminal bulkhead.

In this example, the slack storage portion 230 includes radius-limiting clips 832. The radius-limiting clips 832 allow the slack 800 to be stored in a coiled configuration as it was on the spool drum. The clips 832 prevent the coiled slack 800 from having a radius that is smaller than the minimum bend radius of the coil. In this example, the cable storage clips 832 are radially symmetrically arranged. The cable storage portion 230 is in an interior region of the enclosure so that the slack cable is protected from the ambient.

In some examples, a spool is provided with a drum having a diameter similar to the effective diameter of a cable slack storage structure. Such like diameters enable a slack coil to be disposed on a storage structure without requiring significant manipulation of the coil, such as to substantially adjust its diameter. As just one example, one compatible spool and storage combination may include a spool having a hub diameter of about 5.5 inches (e.g., between 5 and 6 inches, between 4 and 7 inches, etc.) and a slack storage portion with radius limiting clips. The radius limiting clips in this example have an inside diameter of about 5 inches, and an outside diameter of about 8 inches. Of course other dimensions are possible depending on the desired configuration for storing cable on the spool and/or in the storage clips In some cases the inner diameter of the storage clips approximately matches the diameter of the spool hub. In some cases this inner diameter matching can be helpful in transferring the slack coil, while the outer diameter of the storage clips may be more variable.

Referring now to FIGS. 2-4 and 8-9, a method of using the enclosure with a cable dispensing facility will be described. The example system shown in these figures is used to illustrate a method of use, although it is to be understood that other example systems and components disclosed herein and/or provided according to the teachings herein can be used to implement the method.

In one method of dispensing cable, a mounted enclosure 200 is opened by a user so that a mounting surface can be accessed. FIG. 4 shows the opened enclosure 200 with the exposed mounting surface 214. The axle coupling structure or receptacle 216 is then located, and the axle 212 is removably mounted thereto. The axle 212 can be mounted to the receptacle 216 without using tools. In this example, the mounting surface 214 and the receptacle 216 are on an interior region of the enclosure 200. In some examples, they may be located on a different interior or exterior region. In examples where the axle is permanently fixed to a region of the enclosure, the step of mounting the axle is replaced by merely configuring the enclosure such that the axle is accessible.

With the axle 212 securely mounted to the enclosure 200, the spool 210 can be disposed thereon. The spool 210 includes an undispensed amount of cable (not shown). FIG. 3 illustrates the enclosure 200 with the axle 212 secured thereto, and the spool 210 aligned with the axle 212. The spool 201 is mounted on the axle 212 in a proper orientation wherein a proximal flange is proximal to the mounting surface 214 and a removable distal flange is distal from the mounting surface 214. When the spool 210 is fully disposed on the axle 212, a distal end of the axle protrudes from the spool. The spool retainer 220 is then removably attached to the axle 212 to secure the spool 210 on the axle 212. The retainer 220 can be attached to the axle 212 without using tools. The retainer 220 may be selectively positioned at a position along the axle 212 such that the spool 210 is clamped between the mounting surface 214 and the retainer 220 with a desired amount of force. This adjustable clamping force controls the amount of resistance to rotation imposed on the spool 210. FIG. 2 illustrates the enclosure 200 with the cable dispensing assembly 208 attached thereto.

A desired amount of cable is then dispensed from the spool 210. A first end 802 of the cable may be pulled from the spool 210 and routed to a desired location on a premise. As the first end is pulled, the spool 210 rotates with respect to the enclosure 200, axle 212, and retainer 220. Once the desired amount of cable has been paid out, an unused slack 800 remains on the spool. The slack 800 must be removed so that the cable dispensing assembly 208 can be removed from the enclosure 200, and the enclosure can subsequently be closed. To facilitate slack removal, a removable flange is removed from the spool 210. In some examples, the removable flange is removed by tearing it away along a perforated, weakened seam.

The enclosure 200 with the attached cable dispensing assembly 208 is shown in FIG. 8 with the removable flange removed from the spool 210. The slack 800 is visible on the spool 210. The coiled slack 800 can be removed by sliding it off of the spool 210 in a direction outward from the enclosure mounting surface 214. Translationally sliding the slack 800 from the spool 210 enables it to be rapidly removed without requiring the slack 800 to be unwrapped. In some cases unwrapping the slack 800 from the spool 210 can be a time consuming process, and can increase the risk of damaging the cable by bending it beyond a minimum bend radius. Once the cable slack 800 is removed from the spool 210, it is disposed on the cable storage portion 230. The cable storage portion 230 is on the interior region of the enclosure 200, but in other examples a cable storage unit may be located elsewhere on a network component, such as the exterior of an enclosure. FIG. 9 shows enclosure 200 with the cable slack 800 disposed on the radius limiting clips 232 of the cable storage portion 230, with one end 802 of the cable exiting the enclosure 200 and another end 804 of the cable extending through the enclosure and behind the spool 210, where it connects to a terminal bulkhead (not shown).

The used, now empty spool 210 is then removed from the enclosure 200. The retainer 220 is removed from the axle in a manner consistent with the examples presented in the descriptions of FIGS. 5 and 6, thereby freeing the spool. Absent the retainer 220, the spool 210 can be pulled off of the axle 212. In some examples of use, more than one cable is sought to be dispensed from the enclosure 200 during an installation. In such examples, a new spool is inserted onto the axle 212 after the exhausted spool 210 has been removed. The new spool can be secured by the reusable retainer 220, and a desired amount of cable can be dispensed therefrom. A second slack coil can be removed and disposed on the slack storage portion 230 by following the same steps as laid out above. Using this methodology, a technician may be able to dispense any number of cables from any number of spools to the extent that the capacity of the network component or enclosure 200 is met.

After a desired number of cables have been dispensed, the axle 212 can be removed from the receptacle 216 of enclosure 200 in a manner consistent with the description of FIGS. 5 and 6. The ends of the one or more cable slacks 800 are manipulated as desired. This may include connectorizing and attaching the ends to adapters, splicers, filters, and the like. In examples where factory-terminated cables are used, the cables can be directly attached to such elements without requiring a step of connectorizing. When the cables are in a configured state, then the terminal can be closed.

In addition to the examples illustrated by and described with reference to FIGS. 2-4 and 8-9, other examples of network components with a cable dispensing mechanism exist. FIGS. 10-14 show alternative placements of axles in wired communication terminals. Some terminals include axle receptacles designed specifically for a spool axle and others include preexisting receptacles for which universal axles have been designed.

Figure 10:
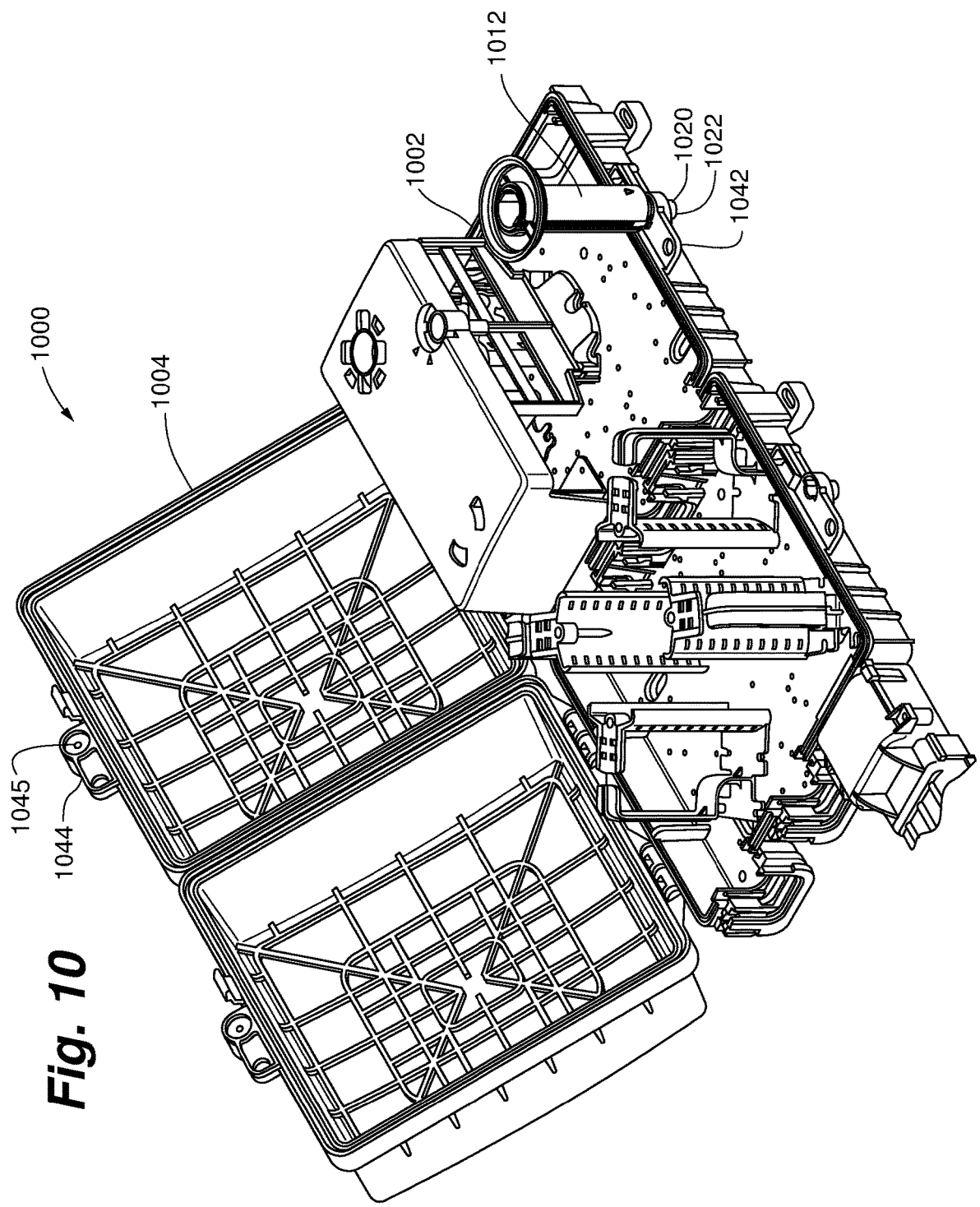
FIG. 10 is a perspective view of a possible terminal enclosure with a spool axle disposed thereon.

FIG. 10 shows an example terminal enclosure 1000 with an axle 1012 mounted thereto. The enclosure 1000 consists of a base 1002 and a door 1004. The base 1002 includes a tab 1042 and the door 1004 includes a tab 1044. The tabs 1042 and 1044 are configured to interface with each other to securely fasten the door 1004 to the base 1002 in a door-closed configuration. Specifically, the door tab 1044 includes a through hole 1045 and the base tab 1042 includes a threaded hole 1043. The holes 1043 and 1045 are configured to receive a threaded fastener that passes through the door hole 1045 and engages with the threads of the threaded base hole 1043 to securely fasten the door 1004 to the base 1002. The system can be retrofitted with an axle such as the axle 1012. The axle 1012 includes a threaded stud that can be screwed in to the base hole 1043 to securely attach the axle 1012 to the enclosure 1000. In some examples, an enclosure such as the enclosure 1000 may be configured as in FIG. 10, but the tab 1042 may be specifically designed to accommodate an axle and a spool. As such, FIG. 10 may not just represent a cable-dispensing facility as a retrofit to an existing network element, but also as an alternative purpose-built design for receiving such cable-dispensing components.

Axles with threaded studs, such as those discussed with reference to FIG. 6, can be attached to any preexisting threaded hole in an enclosure, terminal, or other network component so long as like screw threads are used. Axles can be produced with studs of varying thread type so that old or competitive enclosures, terminals, or other network components can be retrofitted with the spool dispensing hardware disclosed herein. In other examples, such axles can be inserted into through holes present on an enclosure and fastened thereto using a fastening device such as a nut. Axles can be retrofitted to any hole present on a terminal that allows ample space for an axle to protrude and for a cable spool to be disposed thereon. The spool is positioned such that there is a clear path to the exit of the enclosure for the cable end 802 to be routed as the cable is paid out.

Figure 11:
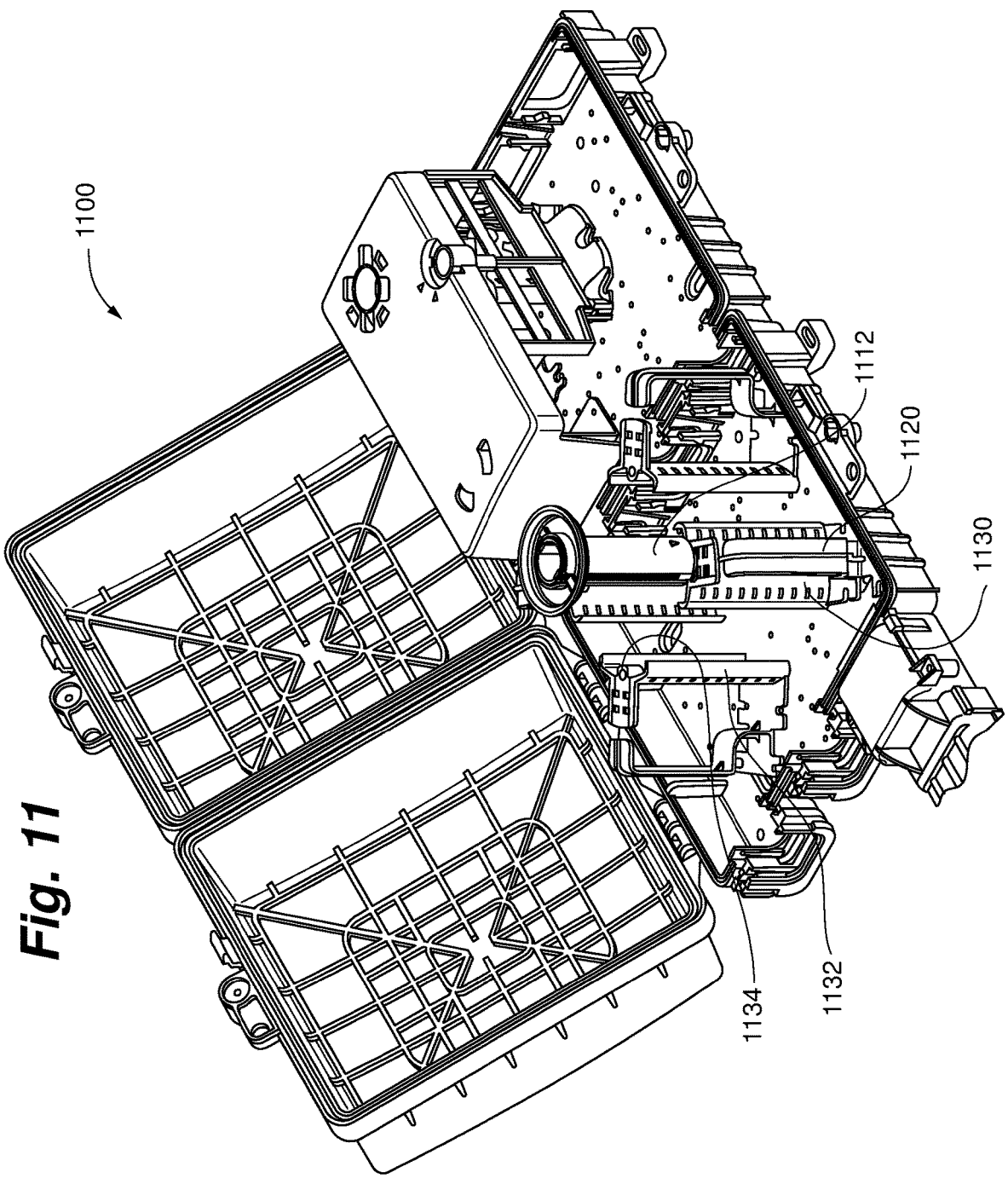
FIG. 11 is a perspective view of another possible terminal enclosure with a spool axle disposed thereon.

FIG. 11 illustrates another example of a network component, or more specifically a terminal including an enclosure, that has been retrofitted with an axle of a cable-dispensing assembly. In this example, an enclosure 1100 has an axle 1112 attached thereto. The axle 1112 is of the threaded stud variety, as discussed above. In this example, the axle has been mounted on radius-limiting clip 1132 of a cable storage unit 1130 of the enclosure. The clips 1132 each contain a through hole 1134. The threaded stud (not shown) of the axle 1112 is inserted into the hole 1134 of clip 1132 and removably secured thereto by a fastener such as a nut (not shown). In other examples, the radius limiting clips 1132 may include a threaded hole configured to receive a threaded stud of an axle. The clip 1132 provides an elevated mounting surface for the axle 1112 that provides ample space for a spool to be mounted without interfering with other parts of the enclosure. The clips of this particular example provide an adequate bearing surface for a proximal face of an attached spool. Some example enclosures, terminals, or other network components might not provide such a surface. For this reason, axles such as the axle 1112 may include an integral flange on the proximal end that provides a bearing surface. This ensures that a spool has adequate mounting support and will not be damaged by any irregular or sharp surfaces that may be present on a network component. As with the system shown in FIG. 10, FIG. 11 may represent a cable-dispensing facility as both a retrofit to an existing network element and as an alternative purpose-built design for receiving such cable-dispensing components. As such, one or more of the clips 1132 may be designed specifically to accommodate an axle, spool, and other cable-dispensing components.

Figure 12:
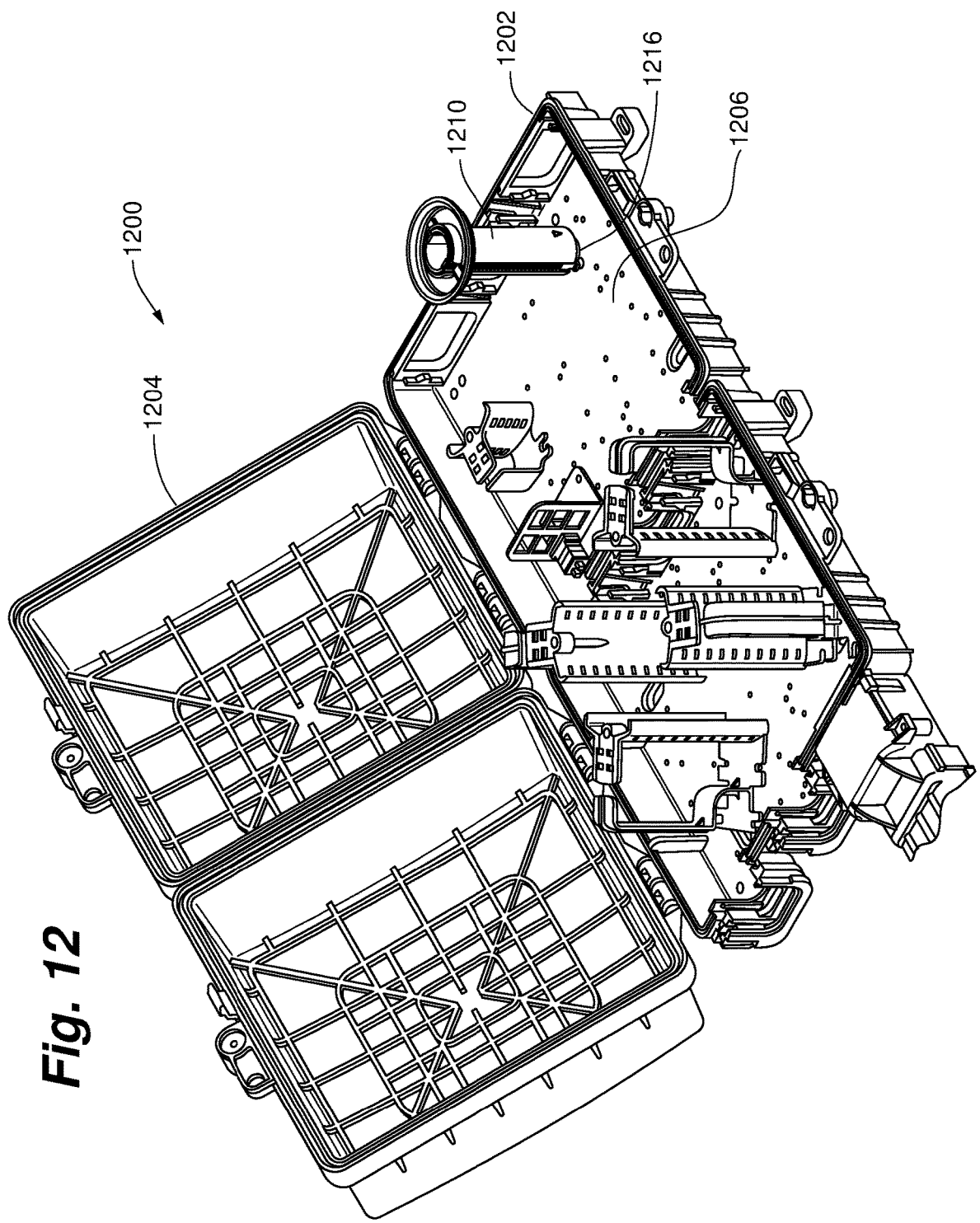
FIG. 12 is a perspective view of another possible terminal enclosure with a spool axle disposed thereon.

Another example of an alternative mounting location of an axle to a network component is shown in FIG. 12. In this example, an enclosure 1200 includes a base 1202 and a door 1204. The base 1202 defines a back surface 1206. An axle 1212 is mounted to the back surface 1206. The back surface includes an axle-coupling receptacle 1216 that removable attaches the axle 1212 to the back surface 1206. In examples where the enclosure 1200 is purposely built to receive an axle and other components of a cable-dispensing facility, the receptacle 1216 may include a bayonet connector, threaded hole, through hole, locking structure, or any other coupling structure discussed herein. In examples where the enclosure 1200 is a preexisting enclosure retrofitted with cable-dispensing hardware, the receptacle may be a threaded hole, through hole, or other structure capable of receiving an axle designed for such an existing structure.

Figure 13:
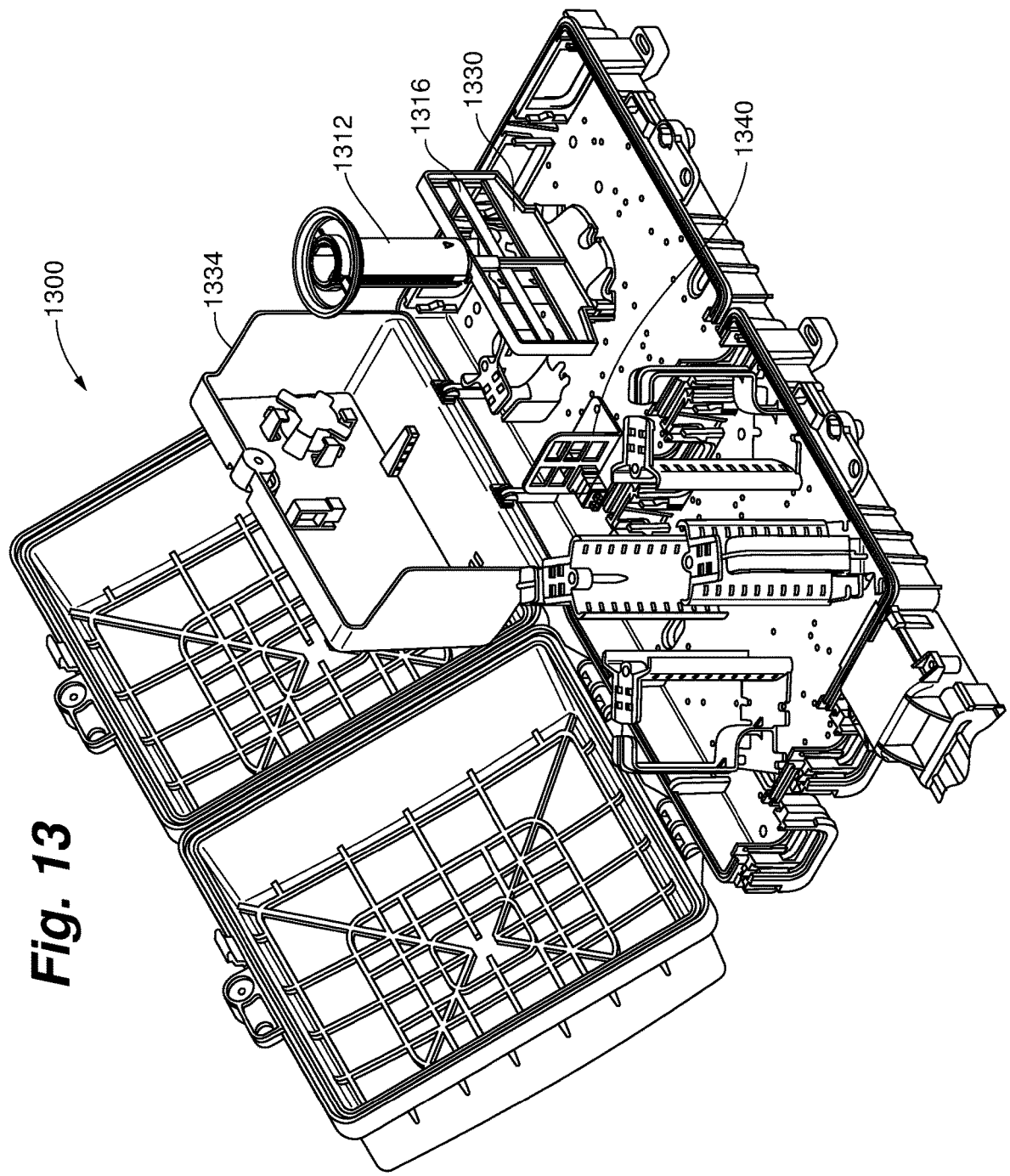
FIG. 13 is a perspective view of another possible terminal enclosure with a spool axle disposed thereon.

FIG. 13 illustrates another example of a network component with an attached spool axle. An enclosure 1300 includes a support structure 1330, a hingedly attached security door 1334, and an adapter assembly 1340. The door 1334 is a securably closeable structure that allows selectable access to the adapter assembly 1340, along with other components that lie underneath the door 1334. The support structure 1330 provides support to the door 1334, and includes a threaded hole 316. The threaded hole 1316 provides the facility to securely fasten the door 1334 to the support structure 1330. In a configuration with the security door 1334 open, an axle 1312 can be removably fastened to the hole 1316. The support structure 1330 provides a bearing surface for a spool (not shown) that may be disposed on the axle 1312. The example shown in FIG. 13 may represent an enclosure capable of being retrofitted with cable-dispensing hardware. Alternatively, FIG. 13 may illustrate a possible axle-mounting position of an enclosure purposely designed to receive cable-dispensing hardware.

Figure 14:
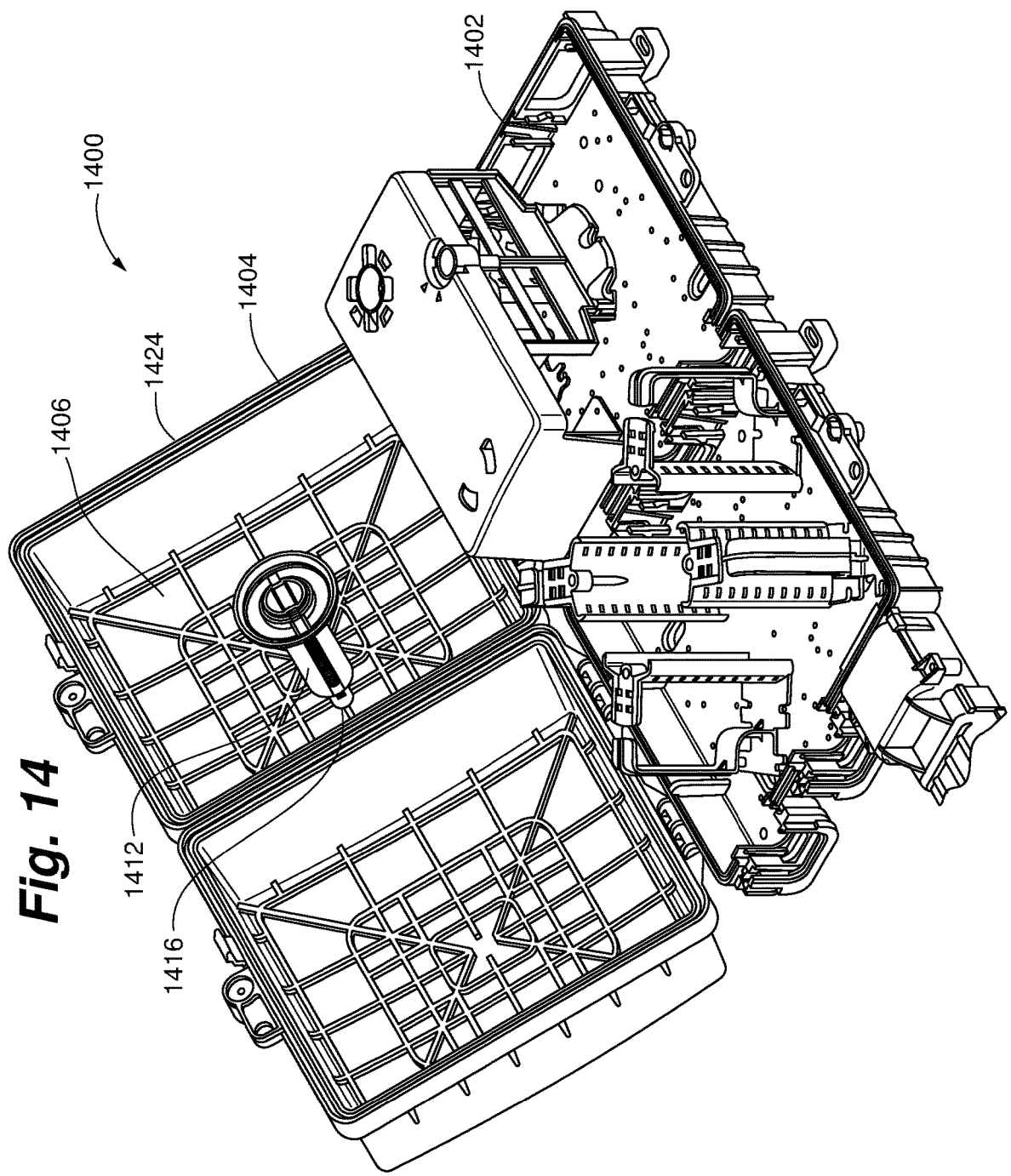
FIG. 14 is a perspective view of another possible terminal enclosure with a spool axle disposed thereon.

FIG. 14 illustrates yet another example of a network component with an attached spool axle. An enclosure 1400 includes a base 1402 and a door 1404. The door includes a front surface 1406, and the front surface 1406 includes an axle-coupling structure 1416. An axle 1412 is removably coupled to the axle-coupling structure 1416. In some examples, the axle-coupling structure 1416 is a hole or other geometry of a preexisting design that allows the axle 1412 to be attached thereto. In other examples the enclosure 1400 is designed specifically to accept spool-dispensing hardware, and the coupling structure 1416 is purposely designed to couple to the axle 1412.

Many possible mounting configurations exist between network components and cable-dispensing hardware. A network component can be purposely designed to attach to components of a cable-dispensing assembly, or components of a cable-dispensing assembly can be purposely designed to be retrofitted onto existing network components.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. An optical fiber termination system, comprising:
a housing comprising:
a base portion including a cable storage portion and a mounting surface defining a receptacle, and
a door portion configured to be hingedly coupled with the base portion so as to be movable between an open configuration and a closed configuration;
an axle configured to removably attach to the receptacle; and
a spool configured to be disposed on the axle, the spool comprising:
a first flange proximal to the mounting surface when the spool is disposed on the axle,
a removable second flange distal to the mounting surface when the spool is disposed on the axle, and
a drum portion coupled between the first flange and the second flange,
wherein the mounting surface is configured to protrude from the base portion and into the door portion when the door portion is in the closed configuration,
wherein the mounting surface is configured to define a bearing surface for the first flange that is disposed outside of the base portion,
wherein the spool is configured to prevent the door portion from moving to the closed configuration when the axle is attached to the receptacle and the spool is disposed on the axle, and
wherein the drum portion is configured to support a coiled fiber optic cable and dispense the fiber optic cable as the spool rotates on the axle.

2. The optical fiber termination system of claim 1,
wherein the second flange is removable from the drum portion, whereby an undispensed coil of the fiber optic cable can be removed from the spool, and
wherein the cable storage portion of the housing is configured to receive the undispensed coil.

3. The optical fiber termination system of claim 1, wherein the cable storage portion comprises storage clips arranged in radial symmetry.

4. The optical fiber termination system of claim 1, wherein the axle is configured to removably attach to the receptacle without the use of a tool.

5. The optical fiber termination system of claim 1, further comprising a retention device configured to removably retain the spool on the axle.

6. The optical fiber termination system of claim 5, wherein the retention device is configured to adjustably apply drag to the spool.

7. The optical fiber termination system of claim 5, wherein the retention device is configured to removably attach to the axle without the use of a tool.

8. The optical fiber termination system of claim 1, wherein the axle is configured to couple to the receptacle by engaging a locking structure or wherein the axle is configured to couple the axle-coupling structure by engaging threads.

9. The optical fiber termination system of claim 1, wherein the axle is configured to couple to the axle-coupling structure by engaging threads.

10. The optical fiber termination system of claim 1, wherein removing the undispensed coil of the fiber optic cable from the spool is performed without unwrapping the coil from the drum portion of the spool.

11. The optical fiber termination system of claim 1, wherein removing the undispensed coil of the fiber optic cable from the spool is performed by translating the undispensed coil outwardly from the mounting surface.

12. The optical fiber termination system of claim 1, wherein the drum portion comprises a hub and an outer cable-mounting surface, wherein the hub comprises an inner axle-mounting portion configured to provide a bearing surface for the axle.

13. The optical fiber termination system of claim 1, wherein the cable storage portion of the housing is in an interior region of the housing.

14. The optical fiber termination system of claim 1, wherein the mounting surface of the housing is in an interior region of the housing.

15. An optical fiber termination system, comprising:
a housing defining an interior region, the housing comprising:
a base portion including a cable storage portion and a mounting surface defining a receptacle, and
a door portion configured to be hingedly coupled with the base portion so as to be movable between an open configuration and a closed configuration;
an axle configured to removably attach to the receptacle;
a spool configured to be disposed on the axle, the spool comprising:
a first flange proximal to the mounting surface when the spool is disposed on the axle,
a removable second flange distal to the mounting surface when the spool is disposed on the axle,
a drum portion coupled between the first flange and the second flange, and
a spool hub that interfaces with the axle; and
a retention device configured to removably retain the cable spool on the axle,
wherein the retention device is configured to define a bearing surface for the spool hub adjacent the second flange of the spool,
wherein the mounting surface is configured to protrude from the base portion and into the door portion when the door portion is in the closed configuration,
wherein the mounting surface is configured to define a bearing surface for the first flange that is disposed outside of the base portion,
wherein the spool is configured to prevent the door portion from moving to the closed configuration when the axle is attached to the receptacle and the spool is disposed on the axle,
wherein the drum portion is configured to support a coiled fiber optic cable and dispense the fiber optic cable as the spool rotates on the axle,
wherein the second flange is removable from the drum portion, whereby an undispensed coil of the fiber optic cable can be removed from the spool,
wherein the mounting surface protrudes from a first half of the base portion, and the cable storage portion is disposed in a second half of the base portion separate from the first half, and
wherein the cable storage portion of the housing is configured to receive the undispensed coil.

16. A method of dispensing optical fiber from an enclosure, comprising:
providing an enclosure defining an interior region, the enclosure including a base portion including a cable storage portion and a mounting surface defining a receptacle, and a door portion configured to be hingedly coupled with the base portion so as to be movable between an open configuration and a closed configuration;

moving the door portion to the open configuration;

removably mounting an axle to a mounting surface that protrudes from the based portion of the enclosure;

disposing a spool on the axle such that the mounting surface is configured to define a bearing surface for a first flange of the spool that is disposed outside of the base portion and the spool is configured to prevent the door portion from moving to the closed configuration when the axle is attached to the receptacle and the spool is disposed on the axle, wherein a fiber optic cable is coiled around a drum portion of the spool and retained thereon by a first flange proximal to the mounting surface and a removable second flange distal to the mounting surface:

removably securing the spool on the axle;

dispensing a desired length of the fiber optic cable from the spool thereby leaving a slack coil comprising a length of the fiber optic cable remaining on the spool;

removing the second flange from the spool;

removing the slack coil from the spool without unwrapping the slack coil;

storing the slack coil within a first interior region of the enclosure;

removing the spool from the axle; and removing the axle from the mounting surface of the interior region of the enclosure.

17. The method of claim 16, wherein the mounting surface of the enclosure is a second interior region of the enclosure.

18. The method of claim 16, wherein removably mounting the axle comprises rotating the axle relative to an axle-coupling structure to engage a locking structure or comprises engaging threads on the axle with threads on an axle-coupling structure.

19. The method of claim 16, wherein removably securing the spool on the axle comprises removably mounting a retention device to an end of the axle distal to the mounting surface.

20. The method of claim 16, wherein removing the slack coil from the spool comprises radially inwardly collapsing the drum portion or comprises translating the slack coil outwardly from the mounting surface.

21. The method of claim 16, wherein storing the slack coil within the interior region of the enclosure comprises holding the slack coil with radially symmetrically arranged storage clips.

22. The method of claim 21, wherein the storage clips form a radius that is not less than one tenth and not more than ten times the radius of the drum portion of the spool.

* * * * *